(12) United States Patent
Truong

(10) Patent No.: US 10,938,833 B2
(45) Date of Patent: Mar. 2, 2021

(54) MULTI-FACTOR AUTHENTICATION BASED ON ROOM IMPULSE RESPONSE

(71) Applicant: NEC Europe Ltd., Heidelberg (DE)

(72) Inventor: Hien Truong, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 392 days.

(21) Appl. No.: 15/704,028

(22) Filed: Sep. 14, 2017

(65) Prior Publication Data

US 2019/0028484 A1    Jan. 24, 2019

Related U.S. Application Data

(60) Provisional application No. 62/535,259, filed on Jul. 21, 2017.

(51) Int. Cl.
| | |
|---|---|
| *G06F 7/04* | (2006.01) |
| *G06F 15/16* | (2006.01) |
| *H04L 29/06* | (2006.01) |
| *G06F 21/40* | (2013.01) |
| *H04L 9/32* | (2006.01) |
| *G01H 7/00* | (2006.01) |

(52) U.S. Cl.
CPC ............ *H04L 63/107* (2013.01); *G06F 21/40* (2013.01); *H04L 9/3271* (2013.01); *H04L 63/08* (2013.01); *H04L 63/0853* (2013.01); *G01H 7/00* (2013.01); *G06F 2221/2111* (2013.01); *H04L 2463/082* (2013.01)

(58) Field of Classification Search
CPC ..... H04L 63/107; H04L 9/3271; G06F 21/40; G06F 2221/2111

USPC ............................................................. 726/4
See application file for complete search history.

(56) References Cited

U.S. PATENT DOCUMENTS

| | | | |
|---|---|---|---|
| 8,447,329 | B2 | 5/2013 | Kadirkamanathan et al. |
| 9,438,440 | B2 | 9/2016 | Burns et al. |
| 2009/0052680 | A1* | 2/2009 | Wang ...................... G01H 7/00 381/59 |

(Continued)

OTHER PUBLICATIONS

Greg Kumparak, SlickLogin Aims to Kill the Password by Singing a Silent Song to Your Smartphone, Sep. 9, 2013.*

(Continued)

*Primary Examiner* — Jeffrey C Pwu
*Assistant Examiner* — Samuel Ambaye
(74) *Attorney, Agent, or Firm* — Leydig, Voit & Mayer, Ltd.

(57) ABSTRACT

A method of multi-factor authentication includes receiving, by a remote hosting server from a terminal, a request from a user possessing a trusted device to access a remote service. The remote hosting server generates challenge chirp signal information and sends the challenge chirp signal information to the terminal and the device. Measurements are received of a room impulse response taken by each of the terminal and the trusted device using the chirp signal information. It is checked whether a location of the terminal is known based on a measurement of the room impulse response. The measurements of the room impulse response of the terminal and the trusted device are compared. A level of access to the remote service is granted to the user based on whether the location of the terminal is known and whether the trusted device is present at the location of the terminal.

15 Claims, 4 Drawing Sheets

(56) References Cited

U.S. PATENT DOCUMENTS

| | | |
|---|---|---|
| 2014/0161270 A1 | 6/2014 | Peters et al. |
| 2015/0215299 A1 | 7/2015 | Burch et al. |
| 2016/0100268 A1* | 4/2016 | Stein .................. H04R 5/00 381/17 |

OTHER PUBLICATIONS

Nikolaos Karapanos, et al., "Sound-Proof: Usable Two-Factor Authentication Based on Ambient Sound", Proceedings of the 24$^{th}$ USENIX Security Symposium, Aug. 12-14, 2015, pp. 1-16.

Wikipedia, "SlickLogin", Jun. 25, 2017, pp. 1-2.

Ruoxi Jia, et al., "SoundLoc: Accurate Room-level Indoor Localization using Acoustic Signatures", 2015 IEEE International Conference on Automation Science and Engineering (CASE), Aug. 24-28, 2015, pp. 186-193.

Mirco Rossi, et al., "RoomSense: An Indoor Positioning System for Smartphones using Active Sound Probing", Proceeding AH '13 Proceedings of the 4$^{th}$ Augmented Human International Conference, Mar. 7-8, 2013, pp. 1-8.

Yu-Chih Tung, et al., ,,EchoTag: Accurate Infrastructure-Free Indoor Location Tagging with Smartphones, Proceedings of the 21th ACM Annual International Conference on Mobile Computing and Networking (MobiCom' 15), Sep. 7-11, 2015, pp. 1-12.

Greg Kumparak: SlickLogin Aims to Kill the Password by Singing a Silent Song to Your Smartphone, TechCrunch, Sep. 9, 2013 (Sep. 9, 2013), XP055212061, p. 1.

Jia Ruoxi et al: "SoundLoc: Accurate room-level indoor localization using acoustic signatures", 2015 IEEE International Conference on Automation Science and Engineering (CASE), IEEE, Aug. 24, 2015 (Aug. 24, 2015), pp. 186-193, XP032791131.

* cited by examiner

MULTI-FACTOR AUTHENTICATION BASED ON ROOM IMPULSE RESPONSE

CROSS-REFERENCE TO RELATED APPLICATION

Priority is claimed to U.S. Provisional Patent Application No. 62/535,259, filed on Jul. 21, 2017, the entire disclosure of which is hereby incorporated by reference herein.

FIELD

The present invention relates to a method for multi-factor authentication (MFA) based on a room impulse response (RIR) and to an MFA system.

BACKGROUND

MFA has been widely used for remote access authentication to enhance security, for example, Google 2-Step Verification, Sound-Proof and SlickLogin. The term MFA refers to the involvement of at least two factors in order to perform authentication. Additionally, MFA is more general and offers increased security. In contrast to single factor authentication, which either simply grants or denies access, MFA can be used to grant access from a spectrum of possibilities, based on multiple factors.

It is common that MFA is triggered when the remote access is from unknown locations or unknown devices, or both. Location information is conventionally obtained from GPS coordinates or from Internet IP address. Once abnormal access is detected, the service being requested will require one or more additional factors to confirm access grant.

State of the art solutions have limitations and are far from being efficient and secure. GPS does not work well in indoor environments and cannot achieve room or meter level accuracy. GPS also requires a long sensing time, up to a minute or more depending on conditions, to provide good location accuracy. On the other hand, an internet address is easily spoofed. These limitations and problems also apply to other indoor localization techniques, such as those based on Wi-Fi.

U.S. Pat. Nos. 9,438,440 and 8,447,329 and U.S. Patent Application Publication No. 2015/0215299 describe proximity detection using audio to estimate distance between devices. The methods described therein serve only for the purpose of proximity detection and are not capable of being used for location fingerprinting.

Echolocation refers to a technique, such as that used by bats and dolphins, of using sound to navigate. Scientific research has proved that the echolocation technique can be used by electronic devices for localization, especially for indoor environments, for example, as described in Ruoxi Jia et al., "SoundLoc: Accurate room-level indoor localization using acoustic signatures," CASE Aug. 24-28, 2015, pp. 186-193 (2015); Mirco Rossi et al., "RoomSense: an indoor positioning system for smartphones using active sound probing," In Proceedings of the 4th Augmented Human International Conference (AH '13), ACM, New York, N.Y., USA, pp. 89-95 (2013); and Yu-Chih Tung et al., "EchoTag: Accurate Infrastructure-Free Indoor Location Tagging with Smartphones," In Proceedings of the 21st Annual International Conference on Mobile Computing and Networking (MobiCom '15). ACM, New York, N.Y., USA, pp. 525-536 (2015), each of which is hereby incorporated by reference herein.

SUMMARY

In an embodiment, the present invention provides a method of multi-factor authentication. A remote hosting server receives, from a terminal, a request from a user to access a remote service hosted on the remote hosting server. The remote hosting server generates challenge chirp signal information and sends the challenge chirp signal information to the terminal. Measurements are received of a room impulse response taken by each of the terminal and the trusted device using the chirp signal information. It is checked whether a location of the terminal is known based on a measurement of the room impulse response. The measurements of the room impulse response of the terminal and the trusted device are compared so as to determine whether the trusted device is at the location of the terminal. A level of access to the remote service is granted to the user based on whether the location of the terminal is known and whether the trusted device is present at the location of the terminal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

MFA based on RIR according to an embodiment of the present invention is a novel technique for remote access authentication in practice. The solution is fast as it requires only a few seconds at most to arrive at an authentication decision. Further, MFA based on RIR does not require pre-installed infrastructure other than a speaker and a microphone, which are commonly available, not expensive and typically a part of modern computing devices, computer terminals and smartphones. Moreover, MFA based on RIR can detect known and unknown locations and the presence of a second factor in a single verification step because the authentication information extracted from RIR can be used for both purposes. Accordingly, MFA based on RIR provides an improved MFA system which is fast, requires minimal inexpensive hardware and is able to perform authentication of multiple factors based on the RIR alone. As a particular improvement over existing MFA systems, MFA based on RIR provides enhanced security by avoiding susceptibility to indoor inaccuracies and IP address spoofing attacks.

According to an embodiment of the present invention, the MFA technique uses an RIR as a signature of the location. A remote service is authorized only by a terminal from a known location and with the presence of valid second factor. The known location is fingerprinted using RIR characteristic(s). The presence of a valid second factor is verified with the same RIR information. By using solely the RIR, two verifications can be made simultaneously: location fingerprint and presence of trusted device.

An impulse response is defined as the time domain response of a system under test to an impulsive stimulus. The "system" can refer to different things such as a microphone or a room space, or a combination of the two. Impulse responses of sound systems will depend on their acoustical environments. An impulse response contains rich information about a sound system including arrival times and frequency content of direct sound, reflections, reverberant decay characteristics, signal-to-noise ratio, and overall frequency response.

Figure 1:
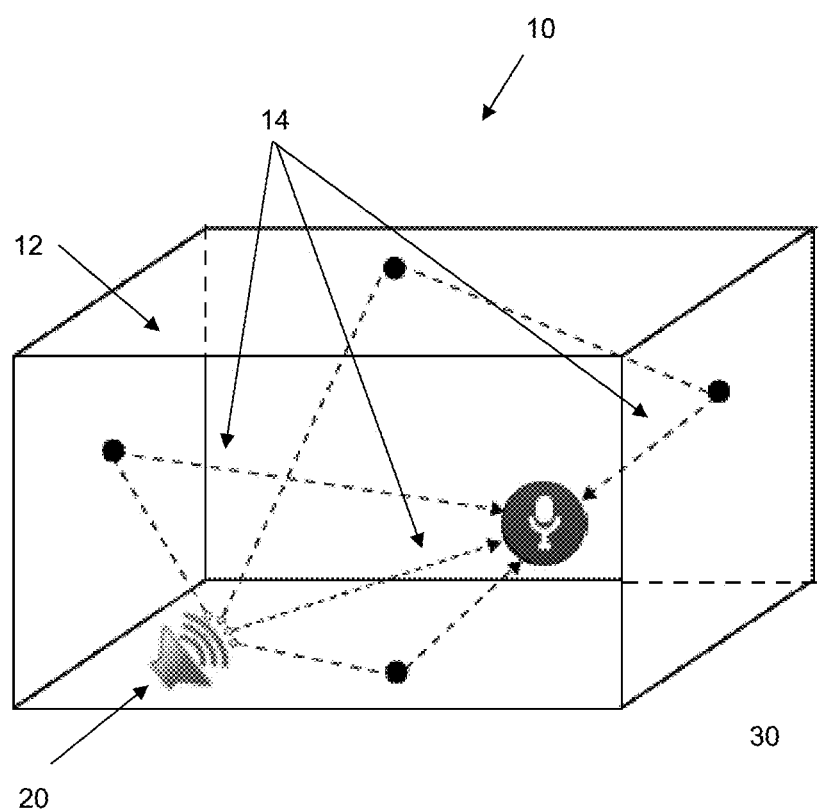
FIG. 1 illustrates sound traveling in an enclosed space.

FIG. 1 schematically shows an MFA system 10 including a closed or semi-closed space 12, such as a room (dwellings, offices, workshops, factory halls, lecture rooms, auditoria, concert halls, transportation terminals, borders, walls, ceilings, obstacles, etc.), an excitation source 20, such as a speaker, and a receiver 30, such as a microphone. Advantageously, the excitation source 20 and receiver 30 can be any computerized device, such as a terminal, tablet or smartphone, which include microphones and speakers as standard hardware. As illustrated in FIG. 1, an acoustical RIR, in this case of the space 12 as the acoustical system, is created by sound radiating outward from the excitation source 20 and bouncing around a room with multiple reflections. Sound traveling by the most direct path arrives first and is the loudest. Reflected sound arrives later by a multitude of paths 14, losing energy to air and surface absorption along the way, so the reflected sound tends to be less loud. In theory, this process goes on forever, however, in practice, the important part of an impulse response is within a few seconds, or even less than a second in small rooms/spaces.

In a linear time-invariant (LTI) system, the RIR can be used to describe the acoustic properties about sound propagation and reflections for a specific source-receiver configuration. Given a room impulse response h(k) and the audio signal s(k), the reverberant microphone signal can be obtained by x(k)=s(k)*h(k) where "*" indicates convolution. Common RIR parameters include the arrival of direct sound, early reflection, reverberant and decay, and the noise floor.

Figure 2:
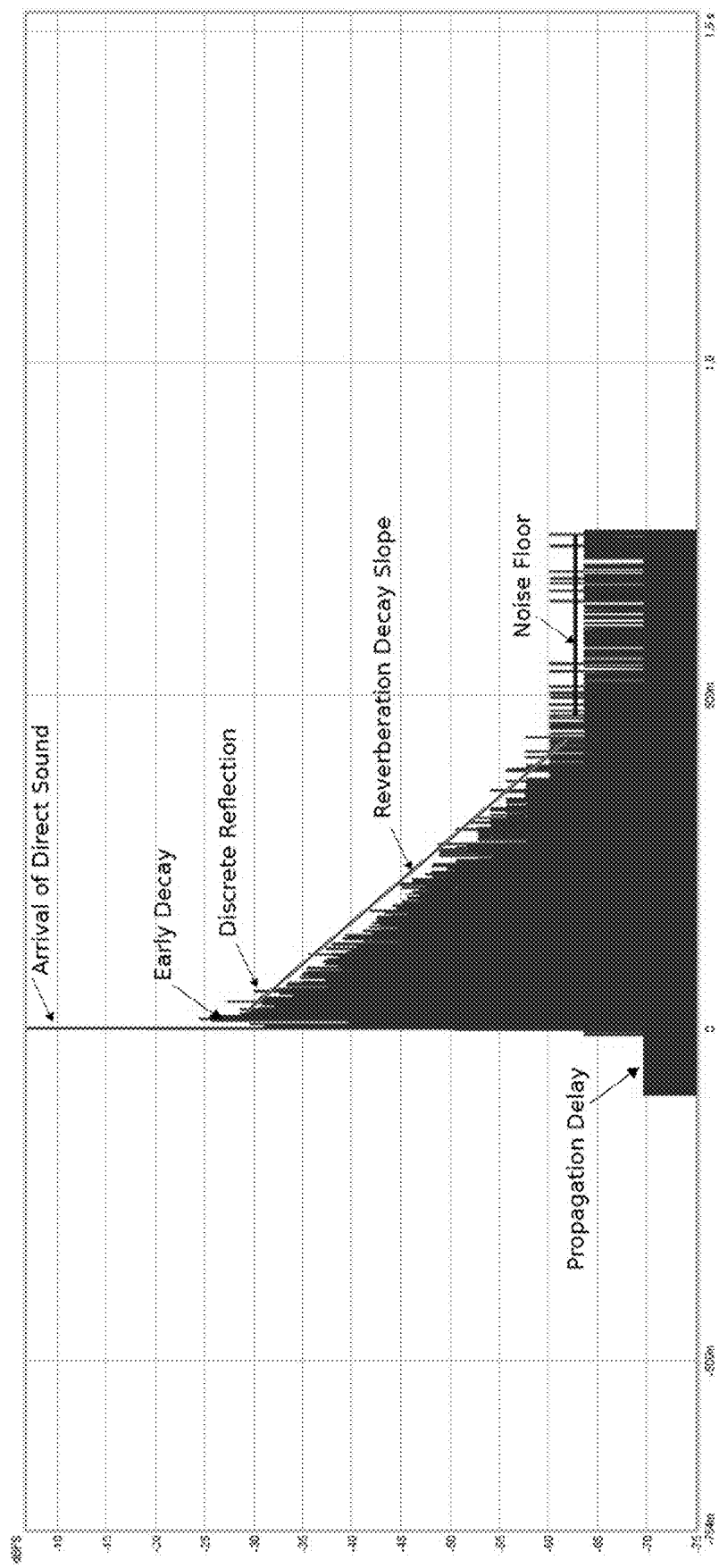
FIG. 2 illustrates an example of an RIR in time domain.

FIG. 2 illustrates an RIR over time. Propagation delay is the time direct sound travels from source to each receiver. Arrival of direct sound is the first part of the RIR. After the arrival of direct sound is the lowest order reflections. Sound that bounces off one surface from source to receiver is called first order reflection; two bounces give second order reflections and so on. Following arrival of direct sound and lowest order reflections, sound travels in reverberant space and creates higher order reflections. Reflected energy builds up reverberant sound. Air loss and material absorption will cause reverberant decay. In practice, in can be in some cases distinguish direct sounds and early reflections. To address this, the first 10 dB of decay after the arrival of direct sound is chosen in the decay curve to be early decay. Reverberant decay is by default measured in the range from 5 dB below level of direct sound to a point of 60 dB below that on the backward energy curve of IR. Noise floor is the point where it is no longer possible to distinguish reverberant sound from the background noise in the measuring condition. Noise in the measurement can come from different sources including ambient noise and electrical noise. Room acoustics concerns the way sound is created, perceived and measured inside enclosures. In general, non-identical rooms should always have non-identical impulse responses. A room does not have a single RIR, but many RIRs since different receiver and source positions will lead to different RIRs of the same room.

Reverberation time ($T_{60}$) is the time required for reflections of a direct sound to decay 60 dB. Reverberation time is a single value when measured in a wide band signal, for example from 20 Hz to 20 kHz. However, it is frequency dependent and therefore is more precisely described in terms of frequency bands (one octave, ⅓ octave, ⅙ octave, etc.). Each band covers a specific range of frequencies. Octave bands are identified by a middle frequency $f_0$, a lower frequency bound $f_1$ and an upper frequency bound $f_h$, determined accordingly depending on bands. A band is one octave in width (an octave band) when the upper band frequency is twice the lower band frequency, $f_1=f_0/2^{1/2}$, $f_h=f_0\times 2^{1/2}$. A one-third octave band has $f_1=f_0/(2^{1/2})^{1/3}=f_0/2^{1/6}$ and $f_h=f_0\times(2^{1/2})^{1/3}=f_0\times 2^{1/6}$. Reverberation time in bands will differ depending on the frequency in measurement. To be precise, a $T_{60}$ should be indicated with frequency ranges that were used for the measurement. Evaluating $T_{60}$ band by band indicates how sound is perceived in an acoustic reverberant space. One of most accurate methods is to compute $T_{60}$ based on a decay curve. The decay curve is a curve obtained by backwards integration of the squared impulse response, which ideally starts from a point where the response falls into the noise floor. The method is called the Schroeder integral method. The slope of the Schroeder curve is used to measure how fast the impulse response decays, deriving the measurement of $T_{60}$. In practice, sometimes the reverberant sound decays to the noise floor less than 60 dB below the level of direct sound, often that is the case in small spaces. In such cases, $T_{30}$ and/or $T_{20}$ can be used. $T_{30}$ is the reverberation time of the room (the time required for a sound to decay of 60 dB) measured over a 30 dB decay range in the Schroeder curve (from −5 to −35 dB), using linear regression techniques. It is the time distance between then −5 dB and the −35 dB, multiplied by 2. $T_{20}$ is the reverberation time of the room measured over a 20 dB decay range (from −5 dB to −20 dB), multiplied by 3.

Accordingly, a number of acoustical parameters can be derived from the room impulse response of an acoustical space is one of its most important characterization since many acoustical. A common method for measuring RIR is to apply a known input signal and to measure the system's output. Therefore, the choice of a measurement method concerns the excitation signal and the deconvolution technique. The excitation signal and the deconvolution technique aim to maximize the signal-to-noise ratio (SNR) of the deconvolved impulse response and allow to eliminate non-linear artifacts in the deconvolved impulse response.

A simple technique is to apply a short duration pulse such as a pistol shot or an electric spark to the room and then measure its response. However, these signals are already longer than a true short impulse. In addition, using a digital impulse of a single sample could not generate sufficient power over a loudspeaker to obtain large SNR required to measure acoustic energy decays. Because of these limitations, various methods were developed to measure the impulse response of rooms without actually using impulsive excitation signals.

RIR measurement methods include the Maximum-Length Sequence (MLS) technique, the Inverse Repeated Sequence (IRS) technique, the Time-Stretched Pulses technique, and the Sine Sweep technique. The choice of the methods often depends critically on the measurement condition. The MLS, IRS and Time-Stretched Pulses methods rely on the assumption of LTI systems. They require that the system under test must be linear and time invariant and will cause distortion artifacts to appear in the deconvolved impulse response when this condition is not fulfilled. The Sine Sweep technique overcomes such limitations. The technique uses an exponential time-growing frequency sweep as the excitation signal. The output of the system in response to the sine sweep stimuli consists of both linear response to the excitation and harmonic distortion at various orders due to the non-linearity in most systems. As the deconvolved output presents a clean separation of linear response and harmonic distortion, it allows to separate impulse response according to the harmonic distortion orders. As harmonic distortions appear prior to the linear impulse response, the linear impulse response is measured correctly even in a non-linear system. It is also possible to characterize the harmonic distortions if desired. In a logarithmic sine sweep technique, the excitation signal is a logarithmic sweep, which means that the frequency increases by a fixed factor per time unit. The Fast Fourier Transform (FFT) spectrum of such a logarithmic sweep declines by 3 dB/octave. Every octave shares the same energy, but this energy spreads out over an increasing bandwidth. Therefore, the magnitude of each frequency component decreases.

Figure 3:
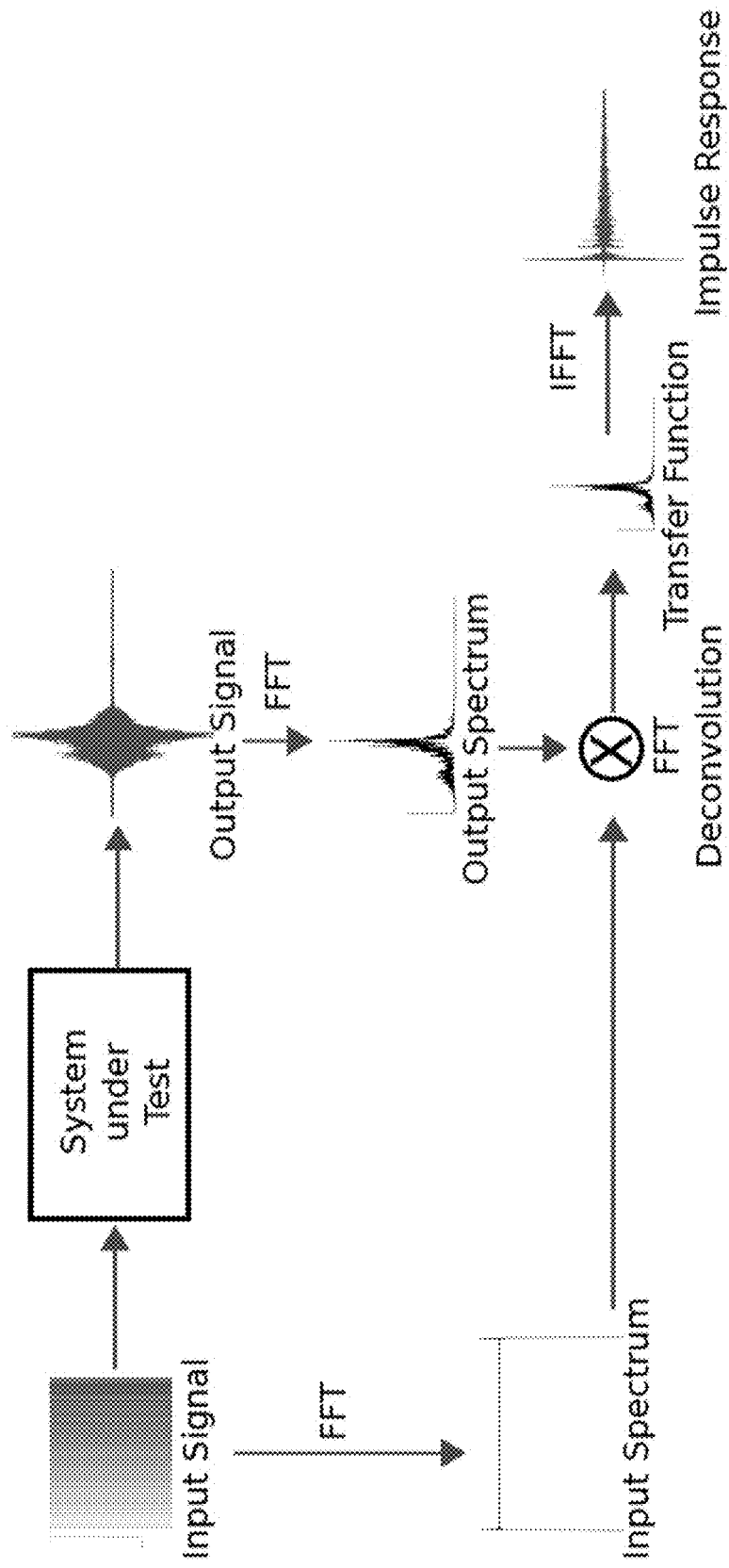
FIG. 3 illustrates steps of making an RIR measurement.

FIG. 3 illustrates an impulse response measurement. An excitation input signal is emitted in the system under test and output signal is recorded. A FFT (Fast Fourier Transform) process is applied on both the input signal and output signal. Output of the FFT process is the spectrum of the corresponding signal that represents amplitudes and phases of individual frequencies. The deconvolution process is then performed. The Transfer Function shows how each frequency has been affected by the system under test that is being measured. An inverse FFT (IFFT) can then be applied to get from the frequency amplitude and phase information to a time domain signal which the impulse response.

In order to measure RIR, an acoustic space is excited using a wide band chirp signal with a frequency, for example, in a range of 0 Hz to 22,050 Hz (half of a maximum frequency sampling rate supported by currently commercial smart phones). Excitation source and the receiver play and record signals, for example, as 16 bit 44,100 Hz PCM audio. The measurement duration is, for example, 2 seconds. Device delay in playing and recording might cause signal loss, and therefore it is possible to add silence parts at the beginning (1 second) and at the end of input signal (2 seconds), making the input signal 5 seconds length in total, in this exemplary measurement procedure. The sound level of a speaker of the excitation source can be calibrated to avoid a clipping effect on a microphone off the receiver. The output signals can be processed by first aligning the input signal and output signal. The actual signal can be cut from the beginning of the signal (without silent part) to 500 ms after the end of the signal (without silent part), as one example. The output signal after cutting can be normalized to account for decreased volume caused by the recording process. The processed input and output signals can then be used to compute RIR, with the following exemplary steps (see also FIG. 3):

1. Convert measured signal (output) $x(k)$ and test signal (input) $s(k)$ from time domain to frequency domain by FFT.
2. Compute inverse of test signal by applying IFFT. The "time reversal mirror" technique is employed: the system's impulse response $FFT(h(k))$ is obtained by convolving the measured signal $FFT(x(k))$ with the time reversal of the test signal $FFT(s(-k))$.
3. Convert impulse response in frequency domain (transfer function) to time domain by IFFT.
4. Extract linear room impulse response. Artifacts caused by noise, non-linear behavior of the loudspeaker and time-variance are removed. Due to a harmonic distortion problem, only first order harmonic signal can be used. First order harmonic is detected based on highest peak in energy decay curve. The highest peak is located and cut from 100 ms before that until 750 ms after. Background noise level is determined by the energy level of 10 ms before direct sound of the first order harmonic. The RIR can then be prepared for use in MFA according to an embodiment of the present invention and for analysis by smoothing the signal and removing infinities introduced in previous steps.

According to an embodiment of the present invention, the MFA system provides a service hosted on a remote server. Remote access needs to be authenticated. Authentication includes a first basic step, for example a traditional username/password based method, and an extended step with additional factors. For the extended step, access from a terminal T is fully granted from known location L with presence of trusted device D. Terminal T and device D record the RIR of the location L. The outputs are RIR(T, L) and RIR(D, L). The server S verifies if RIR(T, L) matches a prior stored RIR value for L and if RIR(T, L) matches RIR(D, L). A proper access level is granted based on the verification result.

Figure 4:
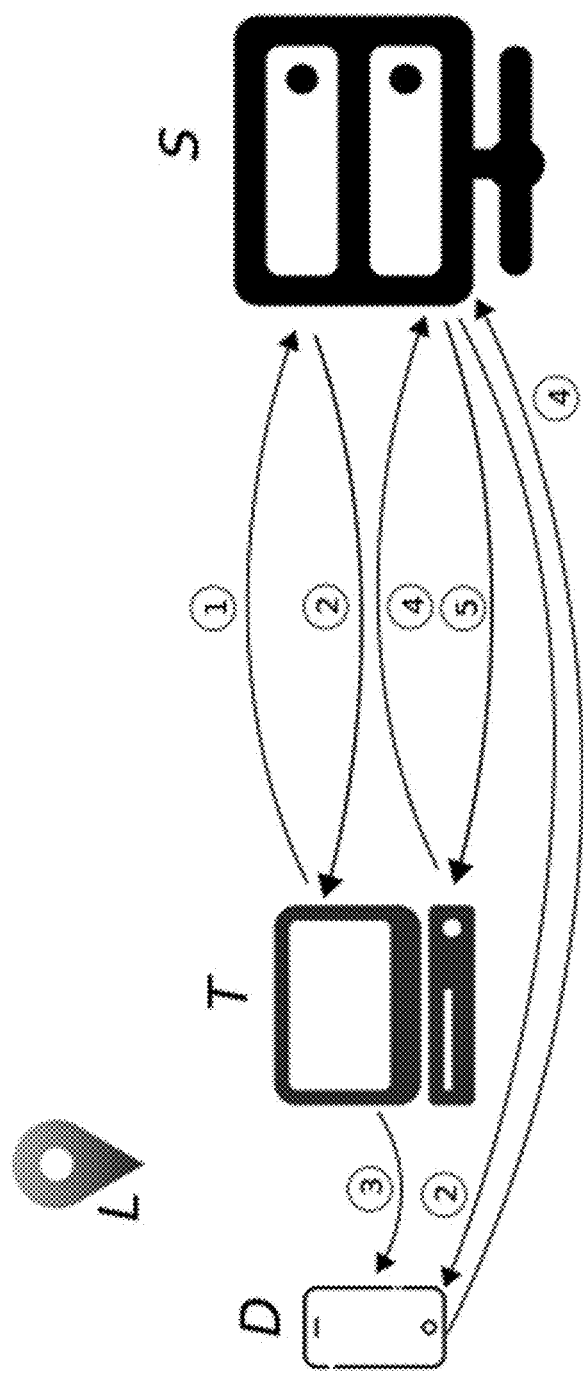
FIG. 4 illustrates an exemplary method and MFA system for MFA based on RIR in accordance with an embodiment of the present invention.

Referring to the embodiment illustrated in FIG. 4, the MFA system is configured to perform MFA based on RIR by executing the following steps:

1. Terminal T receives an access request to a remote service S, and terminal T forwards the request to the remote server hosting S.
2. Remote hosting server S responds to terminal T with a challenge chirp signal information with a selected frequency range. At the same time, remote hosting server S sends device D the same information.
3. Terminal T generates a chirp $s(k)$ using the challenge chirp signal information received from the remote hosting server S, emits the chirp and records the chirp to measure RIR of location L, and gets RIR(T, L). Device D at the same time records the chirp emitted by the terminal T to measure RIR of location L, gets RIR(D, L).
4. RIR(T, L) is sent to remote hosting server S by terminal T; RIR(D, L) is sent to remote hosting server S by device D.
5. Remote hosting server S uses RIR(T, L) to check if location L is known by matching it to one of a plurality of prior stored RIR values. Remote hosting server S compares RIR(T, L) to RIR(D, L) to verify presence of device D at location L. Access is granted based on the factors being confirmed as valid.

One method to compute RIR is to deconvolve the recorded signal and emitted signal. After the RIR signal in time domain is obtained, RIR parameters are extracted for further use. Common parameters for RIR include reverberation time (frequency dependent) and spectrum of energy.

To execute the authentication protocol, the remote hosting server S has learned and stored in memory information about the RIR of location L in advance. It is assumed here that terminal T is at a settled position and that the device D can move around within a proximity of the terminal T. Though each location has a unique RIR, the feature $T_{60}$ extracted from different RIRs in a same room fall in a same range of values with small variations. While the device D being behind large obstacles can present larger variations, device orientation and location in pockets or handbags were not found to cause significant variations in $T_{60}$.

The learning phase can be set any time. In the learning phase, terminal T and device D will learn what is the feature of a location L and in such location, how terminal T and device D perceive the chirp. Then, a model is output as a learning result. For any authentication process later, the received RIR with the $T_{60}$ feature will be fed to the learned model to make a decision. Changes to the acoustic environment, such as removal/addition of obstacles such as furniture can require to reset learning process to build new prediction model. The similarity of the RIR of terminal T and device D is also learned in advance accordingly.

According to an embodiment of the present invention, predictive attacks in which an attacker records the RIR in advance can be advantageously avoided by randomly selecting a frequency range of the chirp for each authentication.

While the present invention is useable in various contexts that require enhanced security with authentication based on multiple factors, in different embodiments, the inventor has found that the MFA system can be especially advantageously used for some particular applications where two devices are in the same location and that location is known and permitted. One such particular application is in the Internet of Things (IoT) application domain. Most of IoT devices nowadays are equipped with a speaker and a microphone. One even further particular application is in the healthcare domain. For example, privacy sensitive hospital patient data is accessed only from terminals at specific locations and by authorized doctors which hold valid access tokens capable of measuring a chirp emitted by the terminal or other devices whose proximity to the terminals can be tested. Yet another particular application is for parental control at home for streaming broadcasts so that only approved content is broadcast to the proper location and trusted device only. In this embodiment, the terminal can be the television or viewing device and the device can be a token or other trusted device whose proximity to the terminal can be tested. Accesses to different channels are granted at different levels based on rooms. For example, the authentication server can be programmed so that kids can only watch limited channels in their rooms, while parents can watch more channels in living room. The same application for broadcasting can be applied for television and video streaming devices in hospitals or in public hotels. Further, the MFA system can be advantageously applied to access control, for example, to entrance door at a given location using a trusted device.

Device proximity verification is described further in Truong, et al., "R-Prox: Proximity Verification Based on Room Impulse Response," which is hereby incorporated by reference herein.

Advantages provided by embodiments of the present invention include:
1. Using a randomly selected challenge-response which is a random frequency range to enhance security and prevent predictive attacks.
2. Multiple factors (locations, presence of trusted devices) are extracted from a single measurement.
3. Parameters extracted from RIR are used for location fingerprint and device proximity verification.
4. Supports continuous authentication because the process does not require user involvement.
5. Works well in indoor environments, especially compared to known MFA methods.
6. No trusted terminal is needed.
7. It is simple to deploy and does not require specific hardware or infrastructure.
8. Localization and MFA verification are done in the same process.
9. It is more secure compared to other solutions which are vulnerable to spoofing attacks and relay attacks.
10. It is easy-to-use and requires minimal user involvement is privacy-preserving, which the real physical location is not disclosed like with GPS based solutions.

As the first MFA mechanism based on RIR, it has the unique characteristic that it can be used for localization and proximity verification for short range distance and room level boundary. This is not replaceable using other sensing information, such as from WiFi, GPS or other audio based techniques.

According to an embodiment of the present invention, multiple factors are extracted from a single measurement of RIR and authentication is granted based on a spectrum of possibilities, here five levels are given:
AL0: access denied if basic authentication steps fails.
AL1: very limited, from untrusted location, without presence of trusted device.
AL2: limited, from untrusted location, with presence of trusted device.
AL3: flexible, from trusted location, without presence of trusted device.
AL4: full access, from trusted location with presence of trusted device.

According to an embodiment of the present invention, a method for MFA using RIR, wherein terminal T is not necessarily trusted and device D is trusted, comprises the steps of:
1. User (who possesses a trusted device) accesses a remote service from terminal T via a primary channel. Terminal T thereby receives an access request to a remote service from a remote hosting server S, and terminal T forwards request to the remote server hosting S. If primary authentication fails, access level AL0 is assigned. Otherwise, the process proceeds to the next step.
2. Once primary authentication passes, the remote service will send a request for additional factors to assign access levels. The request information is about location and presence of a valid personal device. Remote hosting server S responds to terminal T with a challenge chirp signal with a selected frequency range. In order to be inaudible, it can be a high frequency ultrasound.
3. Terminal T emits a chirp signal and records the response to measure RIR of location L, gets RIR(T, L).
4. A device D is informed of authentication request. If the device D is collocated, it records the chirp emitted by terminal T when terminal T emits it. Device D records the chirp signal to measure RIR of location L, and obtains RIR(D, L).
5. [RIR(T, L)] parameters are extracted and sent to remote hosting server S by terminal T.
6. [RIR(D, L)] parameters are sent to remote hosting server S by device D.
7. Remote hosting server S verifies location L and presence of device D.
8. If location L is untrusted (not known/seen prior) and device D is not present, then access level AL1 assigned.
9. If location L is untrusted and device D is present, access level AL2 is assigned.
10. If location L is trusted, but device D is not present, then access level AL3 is assigned.
11. If location L is trusted and trusted device D is present, then access level AL4 is assigned.

RIR parameters can be flexible and are tested before system deployment. They can be, for example, reverberation time, temporal features and spectral features.

The comparison for fingerprinting location and for verifying proximity of trusted device is done by a machine learning model which uses an advanced training process as discussed above. The training model can be updated from time to time, when factors change.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of multi-factor authentication, the method comprising:
   receiving, by a remote hosting server from a terminal, a request from a user to access a remote service hosted on the remote hosting server;
   generating, by the remote hosting server, challenge chirp signal information and sending the challenge chirp signal information to the terminal;
   receiving measurements of a room impulse response taken by each of the terminal and a trusted device of the user using the chirp signal information;
   checking whether a location of the terminal is known based on at least one of the measurements of the room impulse response;
   comparing the measurements of the room impulse response of the terminal and the trusted device so as to determine whether the trusted device is at the location of the terminal; and
   granting a level of access to the remote service based on whether the location is known and whether the trusted device is present at the location of the terminal.

2. The method according to claim 1, wherein the challenge chirp signal information includes a randomly selected frequency range.

3. The method according to claim 1, wherein at least one of the remote hosting server or the device has access to a memory containing known room impulse responses of known locations, the method further comprising accessing the memory to check whether the one of the measured impulse responses corresponds to one of the known impulse responses of one of the known locations.

4. The method according to claim 1, wherein the level of access is full access to the remote service based on the location being known and the trusted device being present at the location of the terminal, and wherein the level of access is limited access to the remote service based on the location of the terminal being unknown and the trusted device being present at the location of the terminal.

5. The method according to claim 4, wherein the level of access is flexible access, which is a higher level of access than the limited access and a lower level of access than the full access, based on the location of the terminal being known and the trusted device being not present at the location of the terminal.

6. The method according to claim 5, further comprising performing an initial authentication step using a username and password and granting either no access or access that is at a lower level than the limited access based on whether the initial authentication step fails or succeeds, respectively.

7. The method according to claim 1, wherein the measurement of the room impulse response from the trusted device is based on a chirp signal emitted by a speaker of the terminal using the chirp signal information that is recorded by a microphone of the trusted device.

8. The method according to claim 1, wherein the steps of checking and comparing are performed by the remote hosting server, and wherein the step of checking is performed using the room impulse response of the terminal.

9. A multi-factor authentication system, the system comprising:
   a terminal disposed in an at least partially enclosed space; and
   a remote hosting server configured to provide for performance of the following steps:
     receiving, from the terminal, a request from a user to access a remote service hosted on the remote hosting server; and
     generating challenge chirp signal information and sending the challenge chirp signal information to the terminal,
   wherein at least one of the remote hosting server or the trusted device is configured to provide for performance of the following steps:
     receiving measurements of a room impulse response taken by each of the terminal and a trusted device of the user using the chirp signal information;
     checking whether a location of the terminal is known based on at least one of the measurements of the room impulse;
     comparing the measurements of the room impulse response of the terminal and the trusted device so as to determine whether the trusted device is at the location of the terminal; and
     granting a level of access to the remote service based on whether the location is known and whether the trusted device is present at the location of the terminal.

10. The multi-factor authentication system according to claim 9, wherein the challenge chirp signal information includes a randomly selected frequency range.

11. The multi-factor authentication system according to claim 9, wherein the at least one of the remote hosting server or the trusted device has access to a memory containing known room impulse responses of known locations and is configured to access the memory to check whether one of the measured impulse responses corresponds to one of the known impulse responses of one of the known locations.

12. The multi-factor authentication system according to claim 9, wherein the remote hosting server is configured to perform the steps of checking and comparing, and to perform the step of checking using the room impulse response of the terminal.

13. The multi-factor authentication system according to claim 9, wherein the terminal includes a speaker and a microphone and the trusted device includes a microphone, the measurements of the room impulse responses being based on a chirp signal emitted by a speaker of the terminal using the chirp signal information that is recorded by the microphones of the terminal and of the trusted device.

14. The multi-factor authentication system according to claim 9, wherein the at least partially enclosed space is an indoor room and the terminal is at a fixed location in the room.

15. A tangible, non-transitory, computer-readable medium having instructions thereon which, under execution by one or more processors, allows for execution of the following steps:

receiving, from a terminal located in an at least partially enclosed space, a request from a user to access a remote service hosted on a remote hosting server;

generating challenge chirp signal information and sending the challenge chirp signal information to the terminal;

receiving measurements of a room impulse response taken by each of the terminal and a trusted device of the user using the chirp signal information;

checking whether a location of the terminal is known based on at least one of the measurements of the room impulse response;

comparing the measurements of the room impulse response of the terminal and the trusted device so as to determine whether the trusted device is at the location of the terminal; and granting a level of access to the remote service based on whether the location is known and whether the trusted device is present at the location of the terminal.

* * * * *